S. D. HUGHES.
ICE PICK.
APPLICATION FILED JAN. 15, 1913.
1,094,569.
Patented Apr. 28, 1914.
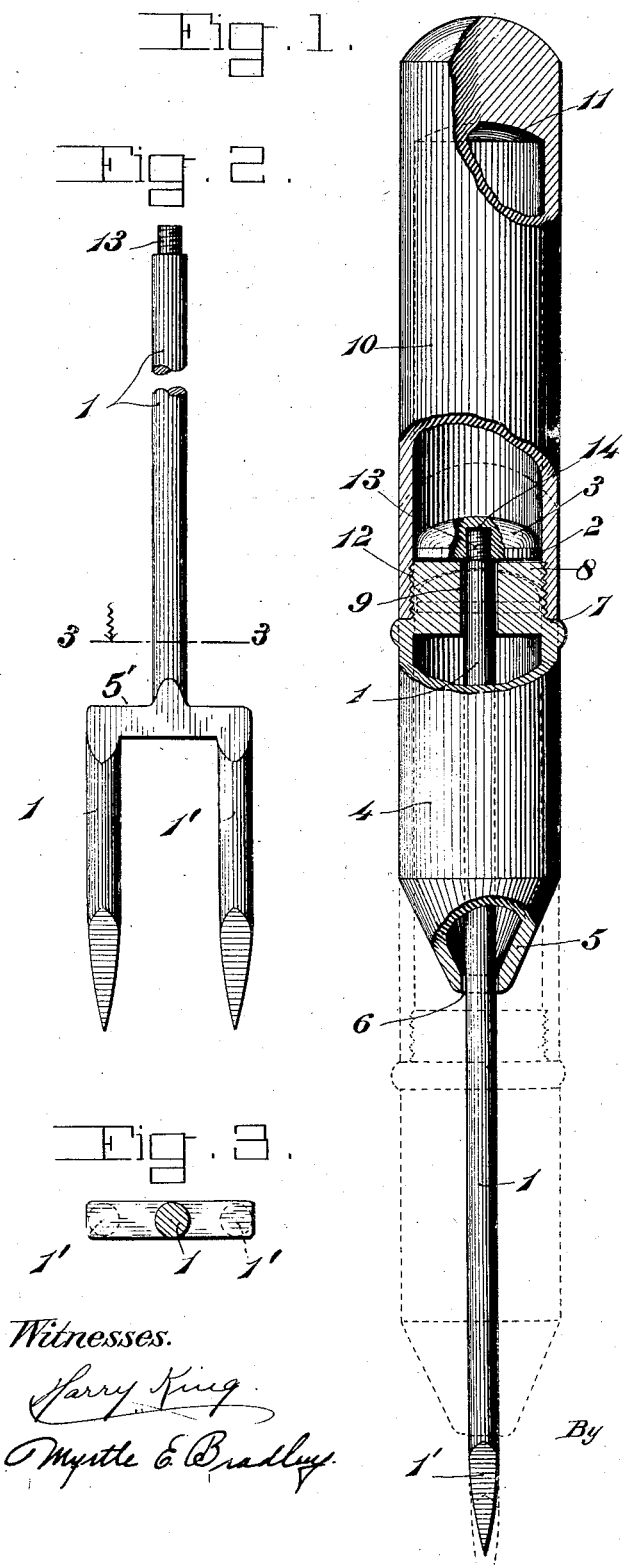
Witnesses.
Harry King
Myrtle E. Bradley
Inventor:
Sidney D. Hughes.
By George W. Lues
Atty.

UNITED STATES PATENT OFFICE.

SIDNEY D. HUGHES, OF LAUREL, MISSISSIPPI.

ICE-PICK.

1,094,569.  Specification of Letters Patent.  Patented Apr. 28, 1914.

Application filed January 15, 1913. Serial No. 742,132.

*To all whom it may concern:*

Be it known that I, SIDNEY D. HUGHES, a citizen of the United States, and a resident of Laurel, in the county of Jones and State of Mississippi, have invented certain new and useful Improvements in Ice-Picks.

One object of my invention is to provide an ice-pick which is held within an operating handle and another object of my invention is to provide a device of this general character of a durable construction, enabling the operator to split large ice blocks, as well as break the blocks into small lumps.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1, shows an elevational view of a pick embodying my invention with parts broken away. Fig. 2, is a broken detached detail of the pick head and stem. Fig. 3, is a section on line 3, 3, of Fig. 2.

In my present invention I provide an ice pick by means of which large blocks of ice may be split, as well as providing a means for chopping up the ice into small lumps or chunks.

In carrying out the aim of my invention I employ a stem 1, the lower end of which is formed into a pick head, in that I provide the tines 1', as shown in Fig. 2. The upper end of the stem 1 ends in the threaded neck 13. The neck 13 is screwed into the threaded socket 14 of the disk 2 having the rounded upper head 3, this disk 2 forming a striker head. Arranged to slidably receive the stem 1, is the tubular sleeve 4, having the converging apertured end 5 within the apertures 6 of which is slidably held the stem 1, as shown in Fig. 1. The opposite end of this sleeve 4 ends in a shoulder 7 from which extends the exteriorly threaded apertured boss 8, through the aperture 9 of which the stem 1 passes as shown. Secured upon the boss 8 is the tubular handle 10 having one end interiorly threaded, as shown at 12, to engage the threaded boss 8, the opposite end of the handle being closed and provided upon the inside with the dished bottom 11, arranged for co-action with the rounded head 3.

The head 3 is arranged to freely slide within the handle 10. In the use of the pick, the pick head is placed upon the ice when the handle 10 is driven downward, so that the face 11, contacts with the head 3, thereby driving the tines 1' into the ice and breaking the same.

The tool is simple and inexpensive in construction and both durable and efficient in operation.

Having thus described my said invention what I claim as new and desire to secure by U. S. Letters Patent is:

A device of the character described having in combination, a tubular handle having one end interiorly threaded the opposite end being closed and having a dished bottom, of a tubular sleeve having a converging apertured end and an opposite exteriorly threaded apertured boss said boss adapted to screw into said handle, a stem having a pick head at one end and a threaded neck at the other arranged to pass through said sleeve apertures, and a circular head secured to said neck and slidably held within said handle to be engaged by said bottom, as and in the manner set forth.

SIDNEY D. HUGHES.

In testimony whereof I affix my signature, in the presence of two witnesses.

Witnesses:
M. C. BUSH,
F. H. BUSH.